United States Patent
Kato

(10) Patent No.: US 12,541,123 B2
(45) Date of Patent: Feb. 3, 2026

(54) VARIABLE MIRROR-EQUIPPED DISPLAY APPARATUS

(71) Applicant: Stanley Electric Co., Ltd., Tokyo (JP)

(72) Inventor: Keisuke Kato, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/835,338

(22) PCT Filed: Jan. 27, 2023

(86) PCT No.: PCT/JP2023/002657
§ 371 (c)(1),
(2) Date: Aug. 1, 2024

(87) PCT Pub. No.: WO2023/149375
PCT Pub. Date: Aug. 10, 2023

(65) Prior Publication Data
US 2025/0138352 A1    May 1, 2025

(30) Foreign Application Priority Data
Feb. 2, 2022 (JP) ................... 2022-014805

(51) Int. Cl.
G02F 1/13 (2006.01)
G02F 1/1335 (2006.01)

(52) U.S. Cl.
CPC ...... G02F 1/1323 (2013.01); G02F 1/133526 (2013.01); G02F 1/133536 (2013.01); G02F 1/133557 (2021.01)

(58) Field of Classification Search
CPC ............ G02F 1/1323; G02F 1/133526; G02F 1/133536; G02F 1/133557
See application file for complete search history.

(56) References Cited

U.S. PATENT DOCUMENTS

2015/0042704 A1    2/2015 Smith et al.
2016/0216540 A1*   7/2016 Cho .................... G02F 1/13471

FOREIGN PATENT DOCUMENTS

| CN | 112666747 A | 4/2021 |
| JP | 2014-112157 A | 6/2014 |
| JP | 2018-101026 A | 6/2018 |
| JP | 2021-138195 A | 9/2021 |

OTHER PUBLICATIONS

International Search Report and Written Opinion for PCT/JP2023/002657 dated Apr. 18, 2023.

* cited by examiner

*Primary Examiner* — Donald L Raleigh
(74) *Attorney, Agent, or Firm* — Kenealy Vaidya LLP

(57) ABSTRACT

To reduce glare due to external light during an image display state of a variable mirror-equipped display apparatus.

The variable mirror-equipped display apparatus that is electrically switchable between a mirror state and an image display state including: a display unit that emits image light; a reflective polarizer disposed on a light emission side of the display unit; a liquid crystal lens disposed opposite the display unit with the reflective polarizer interposed therebetween; and a control device that controls operation of the display unit and the liquid crystal lens; where the liquid crystal lens is electrically switchable under the control of the control device between a first state which exhibits a lens effect and a second state which does not exhibit the lens effect.

13 Claims, 4 Drawing Sheets

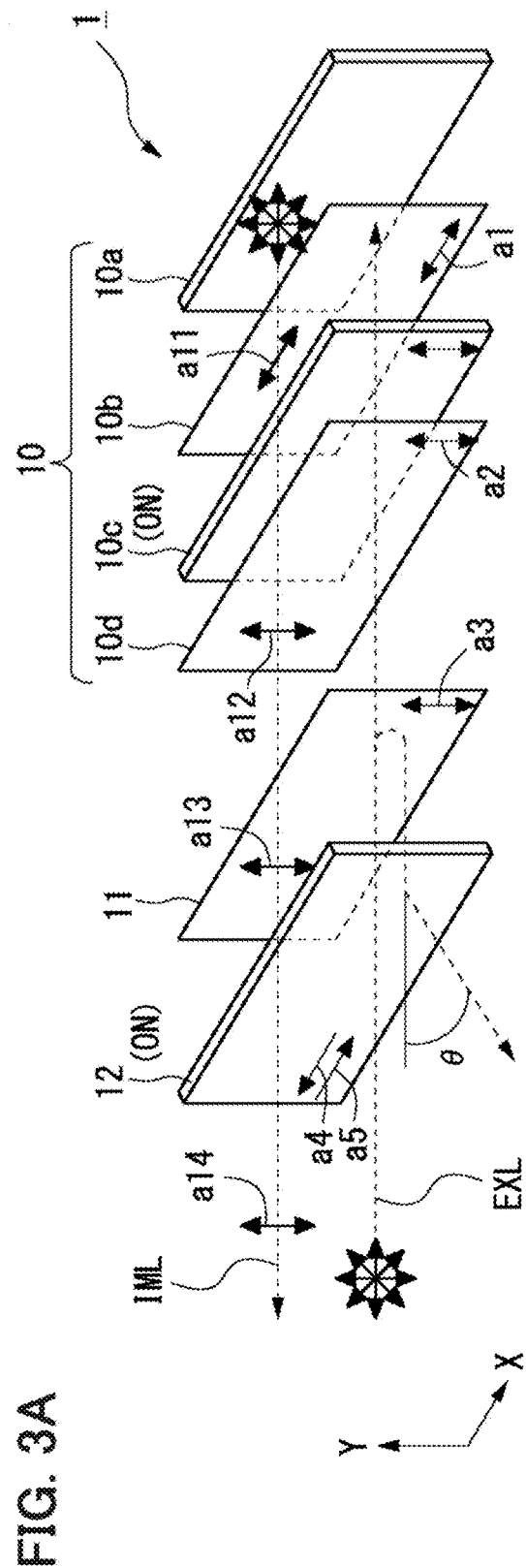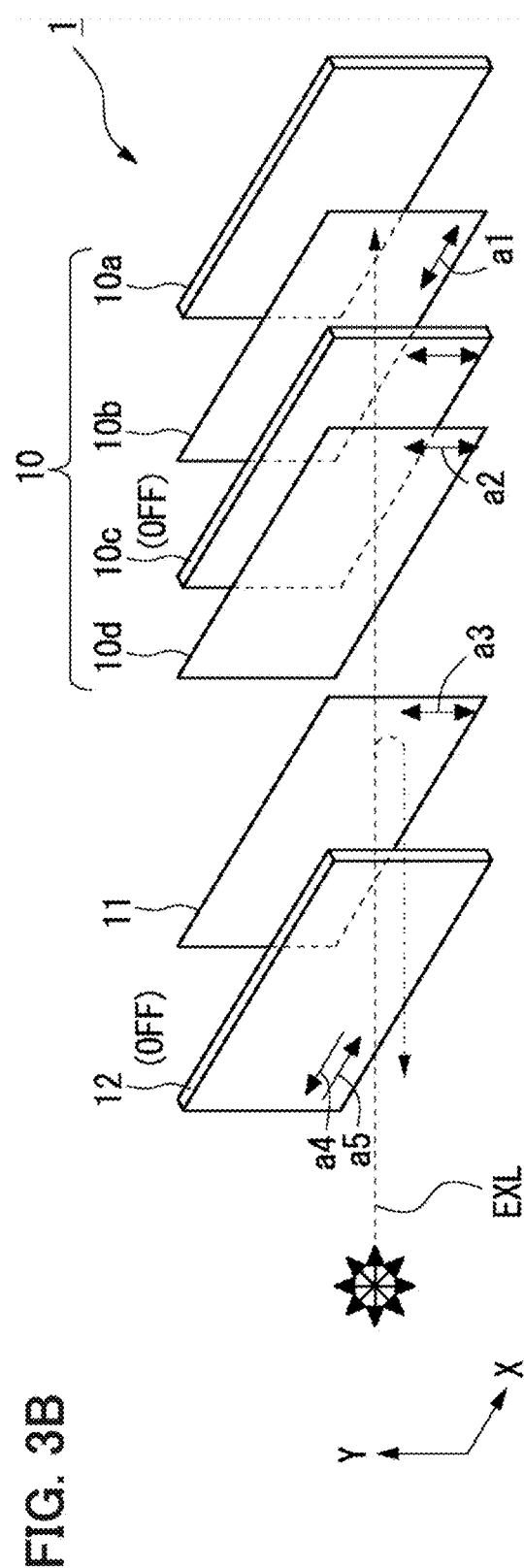

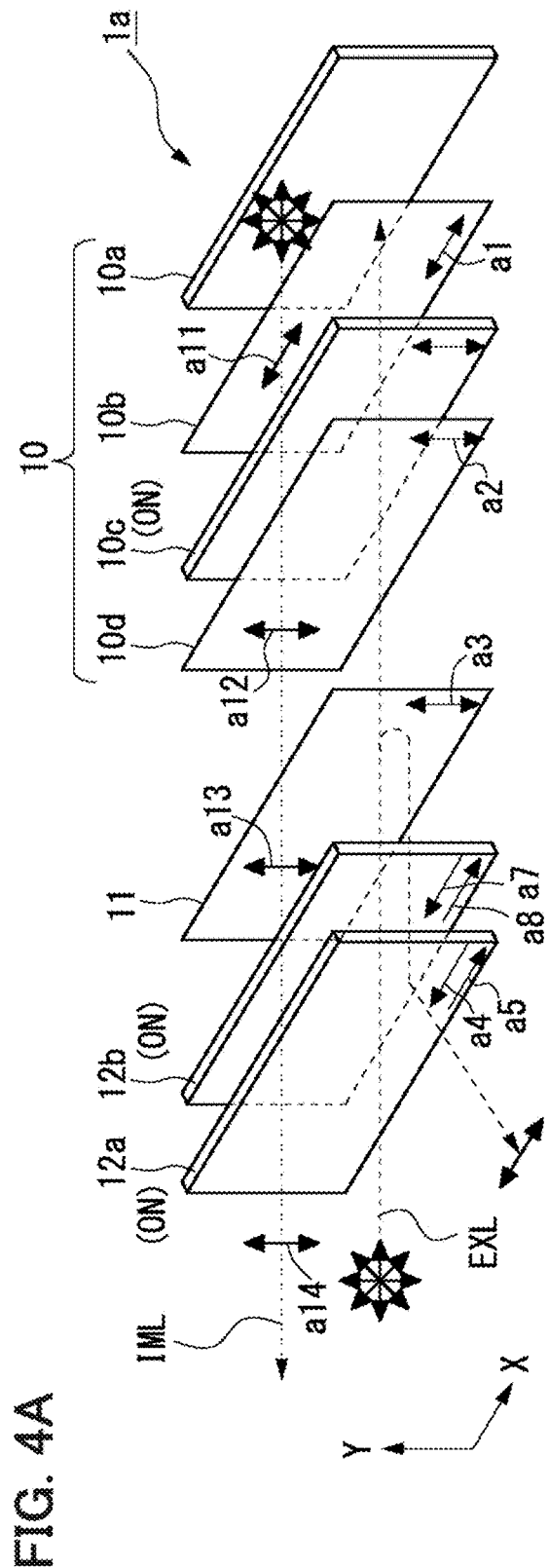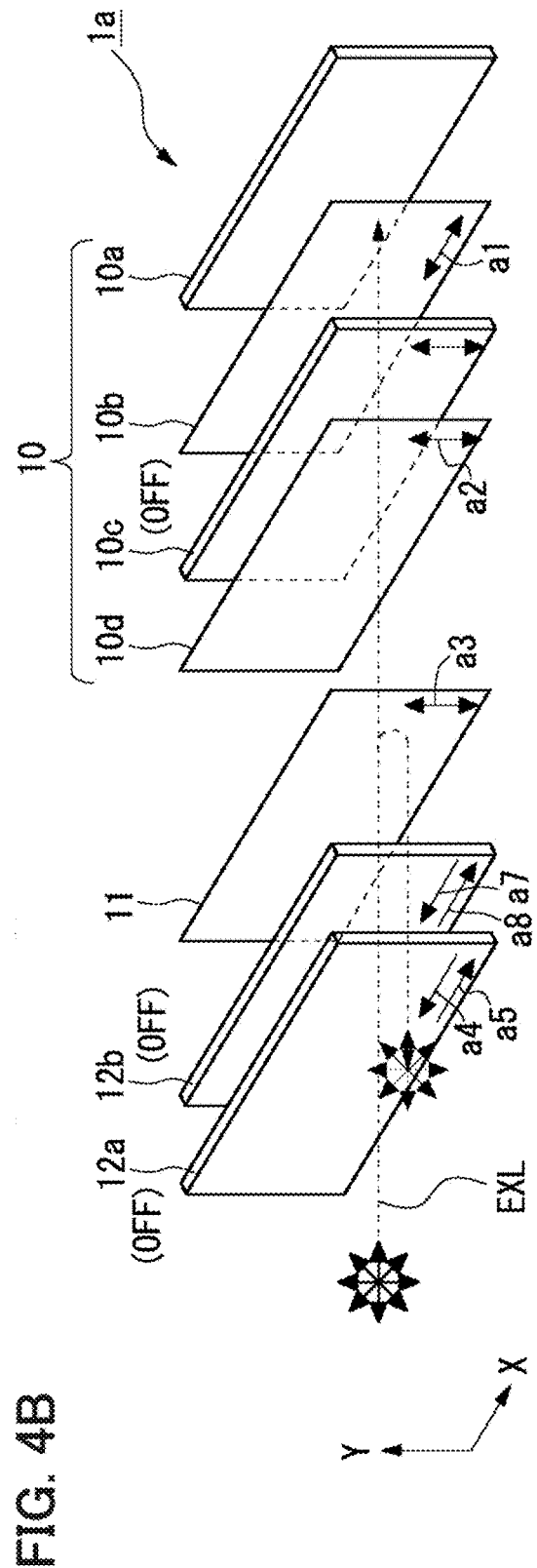

VARIABLE MIRROR-EQUIPPED DISPLAY APPARATUS

This application is a U.S. National Stage Application under 35 U.S.C § 371 of International Patent Application No. PCT/JP2023/002657 filed Jan. 27, 2023, which claims the benefit of priority under 35 U.S.C. § 119 to Japanese Patent Application No. 2022-014805 filed Feb. 2, 2022, the disclosures of all of which are hereby incorporated by reference in their entireties.

TECHNICAL FIELD

The present disclosure relates to a variable mirror-equipped display apparatus.

BACKGROUND ART

As a prior art of a variable mirror-equipped display apparatus, for example, Japanese Unexamined Patent Application Publication No. 2021-138195A (Patent Document 1) describes a vehicle rear-view mirror that is switchable at least between a mirror state and an image display state.

PRIOR ART DOCUMENT

Patent Document

[Patent Document 1] Japanese Unexamined Patent Application Publication No. 2021-138195A

SUMMARY OF THE INVENTION

Technical Problem

In a specific aspect, it is an object of the present disclosure to provide a technology that can reduce glare due to external light during an image display state in a variable mirror-equipped display apparatus that is switchable between a mirror state and the image display state.

Solution to the Problem

A variable mirror-equipped display apparatus according to one aspect of the present disclosure is (a) a variable mirror-equipped display apparatus that: is electrically switchable between a mirror state and an image display state including: (b) a display unit that emits an image light; (c) a reflective polarizer disposed on a light emission side of the display unit; (d) a liquid crystal lens disposed opposite the display unit with the reflective polarizer interposed therebetween; and (e) a control device that controls operation of the display unit and the liquid crystal lens; (f) where the liquid crystal lens is electrically switchable under the control of the control device between a first state which exhibits a lens effect and a second state which does not exhibit the lens effect.

According to the above configuration, it is possible to reduce glare due to external light during an image display state in a variable mirror-equipped display apparatus that is switchable between a mirror state and the image display state.

BRIEF DESCRIPTION OF THE DRAWINGS

FIG. 3A and FIG. 3B are diagrams for explaining the operation of a variable mirror-equipped display apparatus.

FIG. 4A and FIG. 4B are diagrams for explaining the configuration and the operation of a variable mirror-equipped display apparatus according to a modified embodiment.

MODE FOR CARRYING OUT THE INVENTION

Figure 1:
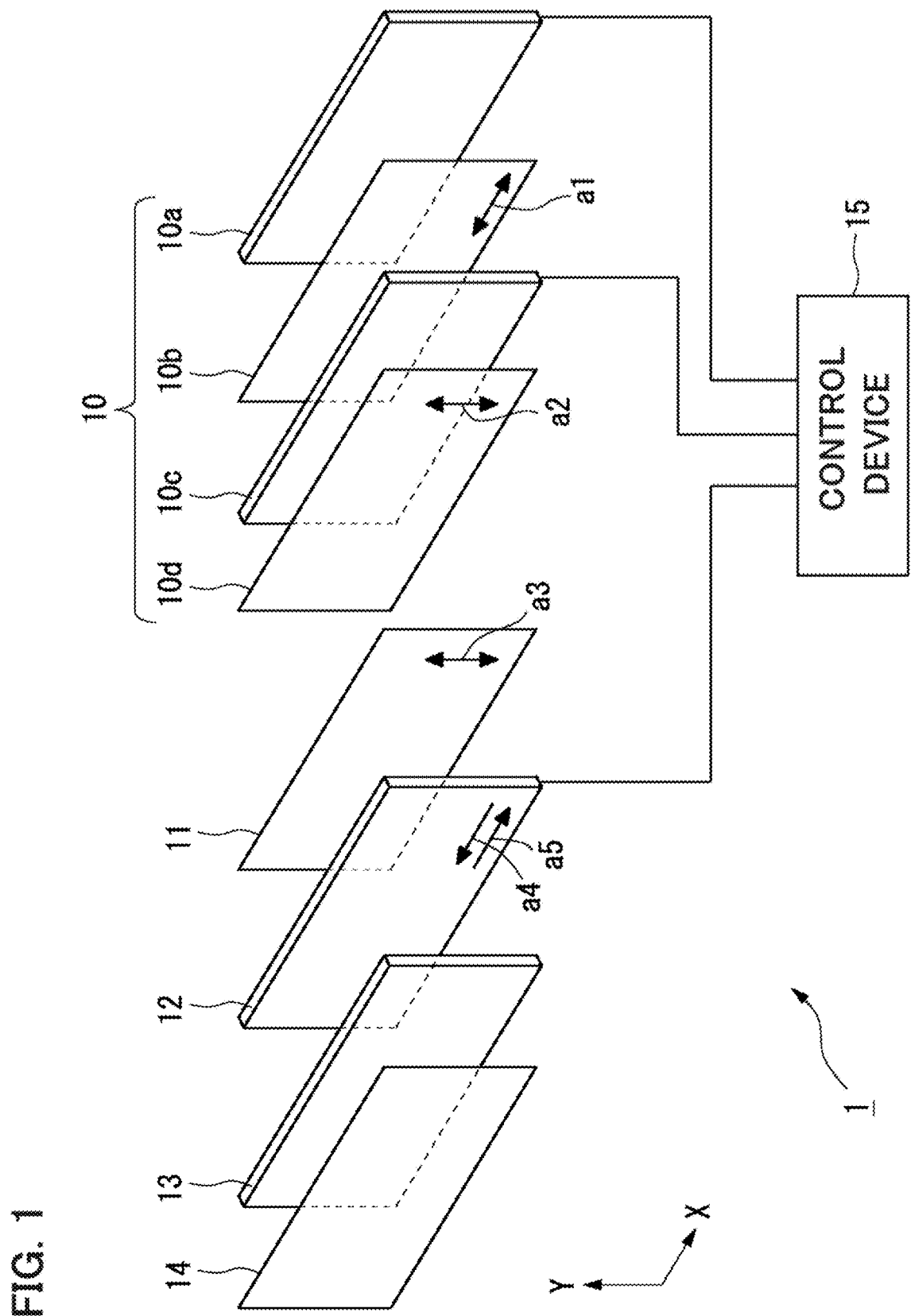
FIG. 1 is a diagram showing a configuration of a variable mirror-equipped display apparatus according to one embodiment.

FIG. 1 is a diagram showing a configuration of a variable mirror-equipped display apparatus according to one embodiment. The variable mirror-equipped display apparatus 1 shown in the figure is configured to include a display unit 10, a reflective polarizer 11, a liquid crystal lens 12, a cover glass 13, and an anti-reflection film 14. The display unit 10 is configured to include a backlight 10$a$, a pair of polarizers 10$b$ and 10$d$, and a liquid crystal panel 10$c$. Here, note that in FIG. 1, each component is shown separated from each other for ease of understanding, but in reality, each component is arranged in close contact with each other without any gaps between each other. The variable mirror-equipped display apparatus 1 is used as a rear-view mirror mounted inside the passenger compartment of a vehicle, for example, and is arbitrarily switchable between a function for displaying various images and a function as a mirror for the driver to check the rearward view.

The display unit 10 generates various images and emits light that constitutes these images (hereinafter referred to as "image light"). In the example shown, the display unit 10 has the liquid crystal panel 10$c$ disposed between the pair of polarizers 10$b$, 10$d$, with the backlight 10$a$ disposed on the side of the polarizer 10$b$. And when planar light emitted from the backlight 10$a$ enters the liquid crystal panel 10$c$ of the display unit 10, this light is appropriately modulated in the liquid crystal panel 10$c$ and passes through the polarizer 10$d$ to form an image light.

In the present embodiment, transmission axis a1 of the polarizer 10$b$ is substantially parallel to the X direction shown in the figure, and transmission axis a2 of the polarizer 10$d$ is substantially parallel to the Y direction which is orthogonal to the X direction. Each of the polarizers 10$b$, 10$d$ is an absorption-type linear polarizer. Further, the liquid crystal panel 10$c$ is an active matrix type liquid crystal panel in which voltage applied to a plurality of pixels arranged in a matrix is controlled by thin film transistors provided corresponding to each of the pixels, for example.

The reflective polarizer 11 is disposed on the front surface side (light emission surface side) of the display unit 10. This reflective polarizer 11 is, for example, equipped with a wire grid made of many thin metal wires, or equipped with an optical multilayer film. In the present embodiment, transmission axis a3 of the reflective polarizer 11 is substantially parallel to the Y direction. Here, note that the reflective polarizer 11 can also serve the function of the polarizer 10$d$ and this polarizer 10$d$ can be omitted, however, by using the reflective polarizer 11 and the polarizer 10$d$ together, the degree of polarization of the transmitted light can be further improved.

The liquid crystal lens 12 is an element that is switchable between a light transmitting state and a lens state by applying a voltage. Various known liquid crystal lenses can be used as such type of liquid crystal lens 12, and those described in publicly known documents such as Japanese Unexamined Patent Application Publication No. 2014-

112157A and Japanese Unexamined Patent Application Publication No. 2018-101026A can be used.

The cover glass 13 is a glass plate disposed on the front surface side (light emission surface side) of the liquid crystal lens 12 to protect the display unit 10, the liquid crystal lens 12, and the like. The anti-reflection film 14 is disposed on the front surface side (light emission surface side) of the cover glass 13 to suppress reflection of external light on the cover glass 13. The control device 15 controls the operation of the backlight 10a, the liquid crystal panel 10c, and the liquid crystal lens 12.

Figure 2:
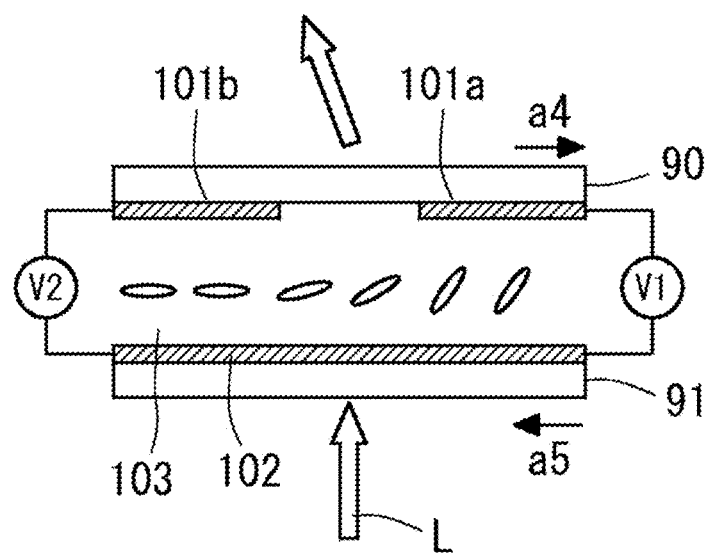
FIG. 2 is a diagram for explaining the operating principle of a liquid crystal lens.

The operating principle of the liquid crystal lens 12 will be described with reference to FIG. 2. The liquid crystal lens 12 in the illustrated example comprises electrodes 101a, 101b provided on a substrate 90 and arranged with a gap therebetween, a common electrode 102 provided on a substrate 91 and arranged opposite each of the electrodes 101a, 101b, and a liquid crystal layer 103 arranged between each of the electrodes 101a, 101b and the common electrode 102. Each of the electrodes 101a, 101b is configured so that voltage can be applied individually from outside.

In the liquid crystal lens 12 shown in the figure, for example, when voltage V1 is applied to the electrode 101a and voltage V2 (<V1) is applied to the electrode 101b, the alignment state of the liquid crystal layer 103 can be changed to generate a refractive index distribution. In the example shown, since the electric field between the electrode 101a and the common electrode 102 is greater, the liquid crystal molecules of the liquid crystal layer 103 which were aligned horizontally undergo a greater change in alignment to the vertical direction. In the part where this refractive index distribution is generated, a lens effect is achieved. In the example shown in the figure, the incident light L is deflected to the left in the figure. The angle of this deflection can be controlled by the difference between voltages V1 and V2. Further, when the magnitude relationship between voltages V1 and V2 is reversed, the direction in which the incident light is deflected will also be reversed. When no voltage is applied between each electrode 101a, 101b and the common electrode 102, the liquid crystal layer 103 will have a uniform distribution, and such a refractive index distribution will not occur. Therefore, depending on whether or not a voltage is applied, it is possible to switch between a light transmitting state and a lens state. Further, by changing the positions of the electrodes 101a, 101b that form the refractive index distribution, it is possible to adjust the direction of refraction. By forming more electrodes, it is possible to generate a variety of refractive index distribution.

The substrates 90 and 91 are each provided with an alignment film (not shown). The alignment treatment direction (e.g., rubbing treatment direction) a4 of the substrate 90 is to the right in the figure, for example, and the alignment treatment direction (e.g., rubbing treatment direction) a5 of the substrate 91 is to the left in the figure, for example. These alignment treatment directions a4 and a5 are arranged substantially parallel to the X direction in the coordinate system shown in FIG. 1. Further, the alignment treatment directions a4 and a5 are also anti-parallel to each other. As a result, the polarized light which is substantially parallel to these alignment treatment directions a4 and a5 is subjected to the refracting action as described above, and changes its direction of travel. On the contrary, the polarized light which is substantially orthogonal to the alignment treatment directions a4 and a5 is not subjected to the refracting action and does not change its direction of travel. Here, the alignment treatment directions a4 and a5 of the liquid crystal lens 12 can be changed as appropriate, depending on the device or purpose to which the variable mirror-equipped display apparatus 1 is applied.

FIG. 3A and FIG. 3B are diagrams for explaining the operation of the variable mirror-equipped display apparatus 1. Here, note that, in FIG. 3A and FIG. 3B, in order to make the operation easier to understand, the cover glass 13, the anti-reflection film 14, and the control device 15 have been omitted. FIG. 3A shows the operation when performing the function of displaying various images, and FIG. 3B shows the operation when performing the function as a mirror for the driver to check the rearward view.

As shown in FIG. 3A, of the unpolarized light emitted from the backlight 10a and incident on the polarizer 10b, its light component having polarization direction all which is the same direction as transmission axis a1 is transmitted and incident on the liquid crystal panel 10c. In the present embodiment, the polarization direction of the light incident on the liquid crystal panel 10c is rotated by 90° by the liquid crystal panel 10c which is in an image display state (ON), and then the light is incident on the polarizer 10d. The polarization direction a12 of this light is substantially parallel to transmission axis a2 of the polarizer 10d, thereby the light passes through the polarizer 10d and is incident on the reflective polarizer 11. Transmission axis a3 of the reflective polarizer 11 is substantially parallel to the polarization direction a12, thereby this light emits from the reflective polarizer 11 as it is. This light with polarization direction a13 is incident on the liquid crystal lens 12. The polarization direction a13 of this light is substantially orthogonal to the alignment treatment directions a4, a5 of the liquid crystal lens 12, thereby the light is emitted without changing its direction of travel. The polarization direction a14 of the image light IML which is the light emitted from the liquid crystal lens 12, is substantially parallel to the Y direction in the figure. Display image is formed by this image light IML.

Unpolarized external light EXL incident on the liquid crystal lens 12 from the outside passes through the liquid crystal lens 12 and enters the reflective polarizer 11, and the light with the same polarization direction as transmission axis a3 passes through the reflective polarizer 11, and then passes through polarizer 10d and the liquid crystal panel 10c. This light that passes through the liquid crystal panel 10c has a polarization direction that is substantially orthogonal to transmission axis a1 of the polarizer 10b, thereby it does not reach the backlight 10a and is absorbed by the polarizer 10b. Further, the light that enters the reflective polarizer 11 and has a polarization direction that is substantially orthogonal to transmission axis a3 is reflected by the reflective polarizer 11 and returns to the liquid crystal lens 12. Since the polarization direction of this light which has returned to the liquid crystal lens 12 is substantially parallel to the alignment treatment directions a4, a5 of the liquid crystal lens 12, the light is subjected to the refracting action of the liquid crystal lenses 12 which is in a state where it exhibits a lens effect due to voltage application (first state), and is refracted at an angle θ and then emits from the liquid crystal lens 12. Depending on the configuration of the liquid crystal lens 12, this angle θ can achieve an angle of 10° or more, for example. That is, the reflected light due to the external light EXL travels in an oblique direction instead of in a front surface direction of the variable mirror-equipped display apparatus 1.

In the present embodiment, as described above, when the planar light emitted from the backlight 10a enters the liquid crystal panel 10c, this light is appropriately modulated at the liquid crystal panel 10c and passes through polarizer 10d to form an image light by the display unit 10. This image light passes through the reflective polarizer 11 as it is, and further passes through the liquid crystal lens 12 as it is to become the image light IML, thereby forming a display image. On the other hand, in the case of external light EXL, the external light component reflected by the reflective polarizer 11, which is the most likely cause of glare due to external light among the external light EXL, is reflected by the reflective polarizer 11 after it passes through the liquid crystal lens 12, and then returns to the liquid crystal lens 12. At this time, when the light component passes through the liquid crystal lens 12, since the liquid crystal lens 12 is in a state where it exhibits a lens effect due to voltage application (first state), the light component which is reflected by the reflective polarizer 11 and then returns to the liquid crystal lens 12 is subjected to the refracting action of the liquid crystal lenses 12 as described above, and is refracted at an angle θ and then emits from the liquid crystal lens 12. That is, the image light IML and the external light component reflected by the reflective polarizer 11 travel in different directions. To describe this differently, separability between the image light IML and the external light component reflected by the reflective polarizer 11 is improved. In other words, glare due to the external light EXL on the displayed image can be reduced. In particular, in a case of a rear-view mirror usage, when the angle θ is set so that the light component is refracted by the liquid crystal lens 12 and travels in an oblique direction, and the angle θ is set in a direction which is different from the driver's (observer of the display apparatus 1) side with the rear-view mirror as the center, such as an opposite direction or an upward direction, glare light to reach the driver can be reduced. Thereby, even when the angle θ is about 5°, it is possible to substantially ignore the glare due to the external light EXL.

Here, in the above description, for ease of understanding, the light component of the external light EXL that passes through the liquid crystal lens 12 and the reflective polarizer 11 and enters the display panel 10 is assumed to be absorbed by the polarizer 11b without reaching the backlight 10a. However, in a strict sense, the external light component that reaches the display panel 10 is also affected by the liquid crystal panel 10c in the display panel 10. Therefore, the polarization direction of a part of the light is rotated by 90° by the liquid crystal panel 10c, passes through the polarizer 10b, and enters the backlight 10a. Here, a part of the light component of the external light EXL that reaches the backlight 10a is reflected by the backlight 10a. Since the backlight 10a is not a regular reflection surface, diffuse reflection occurs. As a result, most of the polarized component is absorbed by the polarizer 10b. That is, most of the component of the external light EXL that enters the backlight 10a is attenuated and is not reflected outside the variable mirror-equipped display apparatus 1. In other words, with regard to the external light component that has passed through the reflective polarizer 11, it is possible to reduce the glare.

On the contrary, as shown in FIG. 3B, when the display unit 10 is in a non-image display state (OFF), the image light IML is not formed. Here, of the non-polarized external light EXL incident on the liquid crystal lens 12, the light having the same polarization direction as transmission axis a3 of the reflective polarizer 11 reaches the polarizer 10b as described above, but does not reach the backlight 10a and is absorbed by the polarizer 10b. Further, of the light incident on the reflective polarizer 11, the having a polarization direction substantially orthogonal to transmission axis a3 is reflected by the reflective polarizer 11 and returns to the liquid crystal lens 12, and this light that has returned to the liquid crystal lens 12 passes through the liquid crystal lens 12 as it is, in which the lens is in a state which does not exhibit a lens effect due to non-voltage application (second state). That is, the reflected light due to the external light EXL is reflected and travels toward the front surface direction of the variable mirror-equipped display apparatus 1. Thus, this reflected light allows the driver to check the rearward view.

Next, a modified example of the above-described embodiment will be described. In the variable mirror-equipped display apparatus 1 of the above-described embodiment, the reflective polarizer 11 can be replaced with a half mirror configured to form a thickness which transmits a metal reflective film. Since the other configuration is the same as that of the above-described embodiment, description thereof will be omitted here, and the modified example will be described with reference to FIG. 1 which is the same diagram as the above-described embodiment. The process of generating image light IML is roughly the same as in the case of the variable mirror-equipped display apparatus 1 of the above-described embodiment, and the light emitted from the display unit 10 becomes a light with a polarization direction a12. This light passes through the half mirror as it is, and then passes through the liquid crystal lens 12 to emit the image light IML.

On the other hand, as for the external light EXL, a part of component light passes through the liquid crystal lens 12 and is reflected by the half mirror, while the other part of component light passes through the half mirror and reaches the display unit 10. The part of component light reflected by the half mirror returns to the liquid crystal lens 12. Here, the light component of the polarized component which is substantially parallel to the alignment treatment directions a4 and a5 of the liquid crystal lens 12 is subjected to the refracting action of the liquid crystal lenses 12 which is in voltage application state (ON), and is refracted and emits from the liquid crystal lens 12. That is, it travels in an oblique direction instead of in the front surface direction of the variable mirror-equipped display apparatus 1. Further, of the part of component light reflected by the half mirror, the light component of the polarized component that is substantially orthogonal to the alignment treatment directions a4 and a5 of the liquid crystal lens 12 is not subjected to the refracting action of the liquid crystal lenses 12 which is in voltage application state (ON). That is, it emits from the liquid crystal lens 12 as it is without being refracted. That is, of the light reflected by the half mirror which is the most common cause of glare among the external light EXL, substantially 50% of the light component of the reflected light travels in an oblique direction instead of in the front surface direction of the variable mirror-equipped display apparatus 1, thereby separability from the image light IML is improved. Here, since the remaining substantially 50% of the light component of the reflected light by the half mirror is not subjected to the refracting action of the liquid crystal lenses 12, compared to the case where the above-described reflective polarizer 11 is used, separability of glare light from the image light IML is not as good. However, it is possible to reduce glare light to a certain extent by using a half mirror which is less expensive than the reflective polarizer 11. Compared to the reflective polarizer 11, there is also an advantage that a half mirror does not need to consider the direction of the transmission axis during installation, thereby is easy to assemble.

Further, of the light component of the external light EXL, the light that passes through the half mirror is attenuated by the half mirror. Furthermore, of the light component that reaches the display unit 10, the component light whose polarization direction is substantially orthogonal to transmission axis a1 of the polarizer 10b does not reach the backlight 10a and is absorbed by the polarizer 10b. Further, the component light whose polarization direction is substantially the same as transmission axis a1 of the polarizer 10b is absorbed or attenuated by the display unit 10, which is generally the same as in the above-described embodiment. As a result, of the light component of the external light EXL that pass through the half mirror, glare due to the external light during the image display state can be reduced as well.

FIG. 4A and FIG. 4B are diagrams for explaining the configuration and the operation of a variable mirror-equipped display apparatus 1a according to another modified embodiment. Here, note that in FIG. 4A and FIG. 4B, in order to make the operation easier to understand, the cover glass 13, the anti-reflection film 14, and the control device 15 have been omitted. FIG. 4A shows the operation when performing the function of displaying various images, and FIG. 4B shows the operation when performing the function as a mirror for the driver to check the rearward view.

The variable mirror-equipped display apparatus 1a is different from the variable mirror-equipped display apparatus 1 of the embodiment shown in FIG. 1 in that the liquid crystal lens 12 is replaced with two liquid crystal lenses 12a and 12b. The liquid crystal lens 12b is disposed on the front surface side (light emission side) of the reflective polarizer 11. The liquid crystal lens 12a is disposed on the front surface side (light emission side) of the liquid crystal lens 12b. The alignment treatment directions a4 and a5 of the liquid crystal lens 12a are substantially parallel to the X direction, and the alignment treatment directions a7 and a8 of the liquid crystal lens 12b are also substantially parallel to the X direction. In other words, the alignment treatment directions a4 and a5 of the liquid crystal lens 12a and the alignment treatment directions a7 and a8 of the liquid crystal lens 12b are substantially parallel.

As shown in FIG. 4A, the process of generating image light IML is generally similar to that of the variable mirror-equipped display apparatus 1 of the embodiment described above. On the other hand, with regard to the external light EXL, the light passes through two liquid crystal lenses 12a and 12b, is reflected by a reflective polarizer 11 to enter the liquid crystal lens 12b, exits liquid crystal lens 12b to enter liquid crystal lens 12a.

Of the reflected light, the light with the polarization component substantially parallel to the alignment treatment direction a4, a5 of the liquid crystal lens 12a and the light with the polarization component substantially parallel to the alignment treatment direction a7, a8 of the liquid crystal lens 12b is subjected to the refracting action of the liquid crystal lenses 12a, 12b which are in voltage application state (ON) and is refracted, and then the light emits from the liquid crystal lens 12a. Since the alignment treatment directions of the two liquid crystal lenses 12a, 12b are substantially parallel, the light with the polarization component substantially parallel to the alignment treatment direction a4, a5, a7, a8 are subjected to the refracting action of the liquid crystal lenses 12a, 12b and is emitted. In other words, compared to the case of using a single liquid crystal lens, the reflected light by the external light EXL can be refracted more greatly in an oblique direction, instead of in the front surface direction of the variable mirror-equipped display apparatus 1a. Thus, separability from the image light IML is improved. In other words, it is possible to reduce glare due to the external light EXL on the displayed image.

On the other hand, as shown in FIG. 4B, when the display unit 10 is in a non-image display state (OFF), no image light IML is formed. Here, a partial component of the non-polarized external light EXL incident on the liquid crystal lens 12a passes through the liquid crystal lens 12b, and is reflected by the reflective polarizer 11, and then returns to the liquid crystal lens 12b. The light that has returned to the liquid crystal lens 12b passes through each of the liquid crystal lenses 12a and 12b as it is, where these lenses are in non-voltage application state (OFF). In other words, the reflected light by the external light EXL is reflected and travels toward the front surface direction of the variable mirror-equipped display apparatus 1a. Therefore, this allows the driver to check the rearward view.

According to each of the embodiments described above, it is possible to reduce glare due to external light during an image display state in a variable mirror-equipped display apparatus that is switchable at least between a mirror state and the image display state.

Here, the present disclosure is not limited to the content of each of the embodiments described above, and can be implemented with various modifications within the scope of the gist of the present disclosure. For example, in each of the above-described embodiments, a liquid crystal panel is used as an example of a display unit, but the configuration of the display unit is not limited thereto, and any display unit that emits linearly polarized or circularly polarized image light can be used. For example, a display unit using an organic electroluminescence element can be used. Further, in each of the above-described embodiments, an in-vehicle mirror is provided as an application example of a variable mirror-equipped display apparatus according to the present disclosure, but the scope of application of the present disclosure is not limited thereto, and can be applied to consumer products such as housing equipment.

REFERENCE SIGNS LIST

1: Variable mirror-equipped display apparatus
10: Display unit
10a: Backlight
10b, 10d: Polarizer
10c: Liquid crystal panel
11: Reflective polarizer
12: Liquid crystal lens
13: Cover glass
14: Anti-reflection film
15: Control device

The invention claimed is:

1. A variable mirror-equipped display apparatus that is electrically switchable between a mirror state and an image display state comprising:
    a display unit that emits image light;
    a half mirror disposed on a light emission side of the display unit;
    a liquid crystal lens disposed opposite the display unit with the half mirror interposed therebetween; and
    a control device that controls operation of the display unit and the liquid crystal lens;
    wherein the liquid crystal lens is electrically switchable under the control of the control device between a first state which exhibits a lens effect and a second state which does not exhibit the lens effect.

2. The variable mirror-equipped display apparatus according to claim 1,
    wherein the control device is configured to control the liquid crystal lens to the first state when controlling the display unit to emit the image light, and to control the liquid crystal lens to the second state when controlling the display unit not to emit the image light.

3. The variable mirror-equipped display apparatus according to claim 1,
wherein the display unit has a liquid crystal panel and a first polarizer and a second polarizer disposed opposite each other with the liquid crystal panel interposed therebetween.

4. The variable mirror-equipped display apparatus according to claim 2,
wherein the display unit has a liquid crystal panel and a first polarizer and a second polarizer disposed opposite each other with the liquid crystal panel interposed therebetween.

5. The variable mirror-equipped display apparatus according to claim 2,
wherein the liquid crystal lens is a linear polarization type liquid crystal lens that causes an incident linearly polarized light to refract in the first state and does not cause the incident linearly polarized light to refract in the second state.

6. The variable mirror-equipped display apparatus according to claim 2,
wherein a second liquid crystal lens is disposed on the front surface side of the liquid crystal lens.

7. The variable mirror-equipped display apparatus according to claim 1,
wherein the display unit is a display apparatus using an organic electroluminescence element.

8. A rear-view mirror configured to be mounted inside the passenger compartment of a vehicle and electrically switchable between a mirror state and an image display state, comprising:
a display unit that emits an image light;
a reflective polarizer disposed on a light emission side of the display unit;
a liquid crystal lens disposed opposite the display unit with the reflective polarizer interposed therebetween; and
a control device that controls operation of the display unit and the liquid crystal lens, thereby electrically switching between the mirror state and the image display state;
wherein the display unit includes a backlight that emits planar light toward the light emission side, a liquid crystal panel located between the backlight and the reflective polarizer, and a first absorption-type linear polarizer located between the liquid crystal panel and the backlight,
wherein the liquid crystal lens has a pair of substrates, a liquid crystal layer disposed between the pair of substrates, and an alignment film provided on each of the substrates,
wherein the liquid crystal lens is disposed so that the polarization direction of the image light passing through the reflective polarizer from the display unit and incident on the liquid crystal lens is substantially orthogonal to the alignment treatment direction of each of the alignment films,
wherein the reflective polarizer is disposed so that its transmission axis is substantially parallel to the polarization direction of light emitted from the backlight, which passes through the first absorption-type linear polarizer and the liquid crystal panel which is in an image display state and enters the reflective polarizer,
wherein, under the control of the control device, the liquid crystal lens can be electrically switched between a first state in which it exhibits a lens effect and a second state in which it does not exhibit the lens effect,
wherein the image light incident on the liquid crystal lens in the first state exits the liquid crystal lens without changing its traveling direction,
wherein, when the control device controls the liquid crystal panel to an image display state, it controls the liquid crystal lens to be in the first state, and when the control device controls the liquid crystal panel to a non-image display state, it controls the liquid crystal lens to be in the second state,
wherein, when the liquid crystal lens is controlled to be in the first state, external light that passes through the liquid crystal lens and is reflected by the reflective polarizer is refracted at a predetermined angle by the liquid crystal lens and travels in an oblique direction, and
wherein, with the rear-view mirror as the center, the oblique direction is an oblique angle in the direction opposite to an observer's side or an oblique angle in the upward direction.

9. The rear-view mirror according to claim 8,
wherein the display unit further comprises a second absorption-type linear polarizer between the liquid crystal panel and the reflective polarizer.

10. The rear-view mirror according to claim 8,
wherein the liquid crystal lens is a linear polarization type liquid crystal lens that causes an incident linearly polarized light to refract in the first state and does not cause the incident linearly polarized light to refract in the second state,
wherein a transmission axis of the reflective polarizer and a transmission axis of the first polarizer are substantially orthogonal, and
wherein an alignment treatment direction of the liquid crystal lens and the transmission axis of the reflective polarizer are substantially orthogonal.

11. The rear-view mirror according to claim 8,
wherein the reflective polarizer comprises a wire grid made of a large number of thin metal wires, or an optical multilayer film.

12. The rear-view mirror according to claim 10,
wherein the reflective polarizer comprises a wire grid made of a large number of thin metal wires, or an optical multilayer film.

13. The rear-view mirror according to claim 8,
wherein, of a light that is reflected by the reflective polarizer and has returned to the liquid crystal lens, a light component that is approximately parallel to the alignment treatment direction of the liquid crystal lens is subjected to a refracting action, and emits in a direction different from the direction of travel of the image light.

* * * * *